(12) United States Patent
Stewart, Jr. et al.

(10) Patent No.: US 10,697,793 B2
(45) Date of Patent: Jun. 30, 2020

(54) HUB-MOUNTABLE WHEEL-ROTATION DETECTOR

(71) Applicant: Electronic Controls Company, Boise, ID (US)

(72) Inventors: James Edward Bryton Stewart, Jr., Boise, ID (US); John Luis Aldape, Boise, ID (US)

(73) Assignee: Electronic Controls Company, Boise, ID (US)

( * ) Notice: Subject to any disclaimer, the term of this patent is extended or adjusted under 35 U.S.C. 154(b) by 0 days.

(21) Appl. No.: 16/425,853

(22) Filed: May 29, 2019

(65) Prior Publication Data

US 2019/0277653 A1    Sep. 12, 2019

Related U.S. Application Data

(62) Division of application No. 15/688,543, filed on Aug. 28, 2017, now Pat. No. 10,352,723.

(60) Provisional application No. 62/380,899, filed on Aug. 29, 2016.

(51) Int. Cl.
| | |
|---|---|
| *G01C 22/00* | (2006.01) |
| *G01C 22/02* | (2006.01) |
| *B60Q 5/00* | (2006.01) |
| *B60Q 1/22* | (2006.01) |
| *B60Q 1/30* | (2006.01) |
| *B60Q 1/50* | (2006.01) |
| *B60Q 9/00* | (2006.01) |
| *G01P 3/44* | (2006.01) |
| *G01P 3/48* | (2006.01) |
| *B60Q 1/34* | (2006.01) |

(52) U.S. Cl.
CPC ............. *G01C 22/02* (2013.01); *B60Q 1/22* (2013.01); *B60Q 1/305* (2013.01); *B60Q 1/50* (2013.01); *B60Q 5/005* (2013.01); *B60Q 9/00* (2013.01); *G01P 3/44* (2013.01); *B60Q 1/346* (2013.01); *B60Q 2300/11* (2013.01); *B60Q 2300/144* (2013.01); *B60Q 2900/10* (2013.01); *G01C 22/025* (2013.01); *G01P 3/4802* (2013.01)

(58) Field of Classification Search
CPC .............................. G01C 22/00; G01C 22/02
See application file for complete search history.

(56) References Cited

U.S. PATENT DOCUMENTS

| | | | |
|---|---|---|---|
| 4,989,222 A | 1/1991 | Lutts et al. | |
| 5,132,665 A | 7/1992 | Hutchisson et al. | |
| 6,011,827 A * | 1/2000 | Kyrtsos | G01C 22/02 |
| | | | 377/16 |

(Continued)

OTHER PUBLICATIONS

Stemco (US): 575-079 AirBat Driver Alert System, https://web.archive.org/web/20160420153126/http://www.stemco.com/f/qbin/575-0079%20DAS%20update%20Bulletin.pdf, dated Aug. 12, 2013.

(Continued)

*Primary Examiner* — Hai L Nguyen
(74) *Attorney, Agent, or Firm* — Stoel Rives LLP; Robert R. Teel (57) ABSTRACT

A hub-mountable wheel-rotation detector has an electromagnetic generator to convert rotational mechanical energy into electrical energy sufficient to recharge an internal rechargeable battery and power internal alarm and distance-tracking circuitry. The detector provides a combination of backup alarm and hubodometer functionality in a common device.

10 Claims, 8 Drawing Sheets

(56) References Cited

U.S. PATENT DOCUMENTS

| | | |
|---|---|---|
| 6,438,193 B1 | 8/2002 | Ko et al. |
| 6,646,432 B1 | 11/2003 | Malinowski |
| 6,776,261 B2 | 8/2004 | Eriksen et al. |
| 6,940,940 B2 | 9/2005 | Kranz |
| 7,398,141 B2 | 7/2008 | Steph et al. |
| 7,710,239 B2 | 5/2010 | Kranz |
| 8,078,375 B2 | 12/2011 | Steph et al. |
| 8,214,103 B2 | 7/2012 | Kranz et al. |
| 8,352,210 B2 | 1/2013 | Kranz |
| 8,981,919 B2 | 3/2015 | Massey et al. |
| 9,090,206 B2 | 7/2015 | Kranz et al. |
| 9,221,308 B2 | 12/2015 | Nelson et al. |
| 9,349,281 B2 | 5/2016 | May |
| 10,352,723 B2 * | 7/2019 | Stewart, Jr. ............ B60Q 1/305 |

OTHER PUBLICATIONS

Stemco (US): TracBat RF Literature, https://web.archive.org/web/20180424180047/http://www.stemco.com/f/qbin/ TracBatRF_Literature.pdf, dated Mar. 2016.

* cited by examiner

HUB-MOUNTABLE WHEEL-ROTATION DETECTOR

RELATED APPLICATIONS

This application is a divisional of U.S. patent application Ser. No. 15/688,543, filed Aug. 28, 2017, which claims benefit of U.S. Provisional Patent Application No. 62/380,899, filed Aug. 29, 2016, both of which are hereby incorporated by reference.

TECHNICAL FIELD

This disclosure relates generally to vehicle motion sensors and, more particularly, to hub-mountable sensors.

BACKGROUND INFORMATION

Previous attempts at designing hub-mounted vehicle motion sensors have included hub-mounted vehicle backup alarms and hubodometers. For example, an attempt at a hub-mounted vehicle backup alarm design is the subject of U.S. Pat. No. 5,132,665 of Hutchisson et al. Attempts at electronic versions of hubodometer designs are the subjects of U.S. Pat. No. 4,989,222 of Lutts et al. and U.S. Pat. Nos. 6,940,940 and 8,352,210 of Kranz. These previous attempts can be loosely categorized according to designs relying on moving parts (e.g., as in the '665 and '222 patents) and designs lacking moving parts (e.g., as in the '940 and '210 patents).

The previous designs relying on moving parts have employed multiple magnetic-field (e.g., reed or Hall effect) sensors for detecting a magnetic field that varies as a function of wheel rotation. These designs needed two or more such sensors, despite the added cost and complexity, in an attempt to discriminate between forward and reverse motion or to reject effects of spurious motion caused by transient forward and reverse rocking of a wheel. Furthermore, these prior attempts were relatively inefficient at generating electrical power because they were direct-drive systems in which a generator rotated only once per each wheel rotation.

The previous designs lacking moving parts afforded no means by which to produce electrical energy for powering internal electrical circuitry. For that reason, these systems have depended on batteries that must be manually replaced when depleted. Also, these systems use one or more accelerometers to detect motion, but the accelerometers cannot readily distinguish between rotational motion and irrelevant (vibratory) motion. To address this issue, some designs have included complicated signal-processing filter techniques or have used multiple (i.e., redundant) accelerometer signals in attempting to distinguish between meaningful signals representing a wheel rotation and irrelevant signals representing spurious motion.

SUMMARY OF THE DISCLOSURE

Disclosed is a hub-mountable wheel-rotation detector having an electromagnetic generator to convert rotational mechanical energy into electrical energy sufficient to recharge an internal rechargeable battery and power internal alarm and distance-tracking circuitry. In this manner, the disclosed embodiments contemplate a combination of backup alarm and hubodometer functionality in a common device. The modular design may also incorporate a flashing light or a wireless broadcasting unit.

The disclosed embodiments are self-contained, having no external wiring routed to or from the detector. Instead, the detector is powered by its internal rechargeable battery, which is recharged by an internal brushless direct current (DC) motor that generates power as a vehicle wheel rotates. In addition to recharging, the generator output is also used for purposes of determining a direction of rotation, as well as for deriving distance, speed, or other vehicle-travel information. An internal epicyclic gear train and the brushless DC motor operating at high efficiency allow for relatively low-speed charging, e.g., at speeds as low as about 25 to 30 miles per hour (MPH).

A user interface is provided so that a user may establish a configuration setting defining whether the detector is mounted on a right- or left-side mounting location, thereby configuring whether clockwise or counterclockwise rotation is recognized by the detector as the reverse direction. In some embodiments, the user interface includes a switch that indicates the direction.

When the wheel rotates to move the vehicle in a direction recognized as the reverse direction, the backup alarm is triggered and a loud alarm sound is emitted from an internal speaker. Because the detector is activated directly from motion and not from signals indicating that the vehicle is shifted into reverse gear, whether the vehicle is in reverse gear is irrelevant for purposes of activating the alarm because the detector will activate the alarm in response to detecting any reverse motion.

When the wheel rotates to move the vehicle in a direction recognized as the forward direction, the detector counts or otherwise determines wheel rotations for tracking distance traveled and thereby incrementing an odometer. An odometer or other distance-based tracking functionality may be calibrated in the field based on a learning mode function activated with a button accessible on the face of a housing of the detector.

The detector is mountable to various types of hubs. A mounting bracket allows any Department of Transportation (DOT) mandated hubcap to remain visible, if one is installed.

Additional aspects and advantages will be apparent from the following detailed description of embodiments, which proceeds with reference to the accompanying drawings.

BRIEF DESCRIPTION OF THE DRAWINGS

FIGS. 5 and 6 are, respectively, back and front exploded views of the hub-mountable wheel-rotation detector, in which FIG. 6 is annotated with an associated table listing a bill of materials of hardware components of the detector.

DETAILED DESCRIPTION OF EMBODIMENTS

Figure 1:
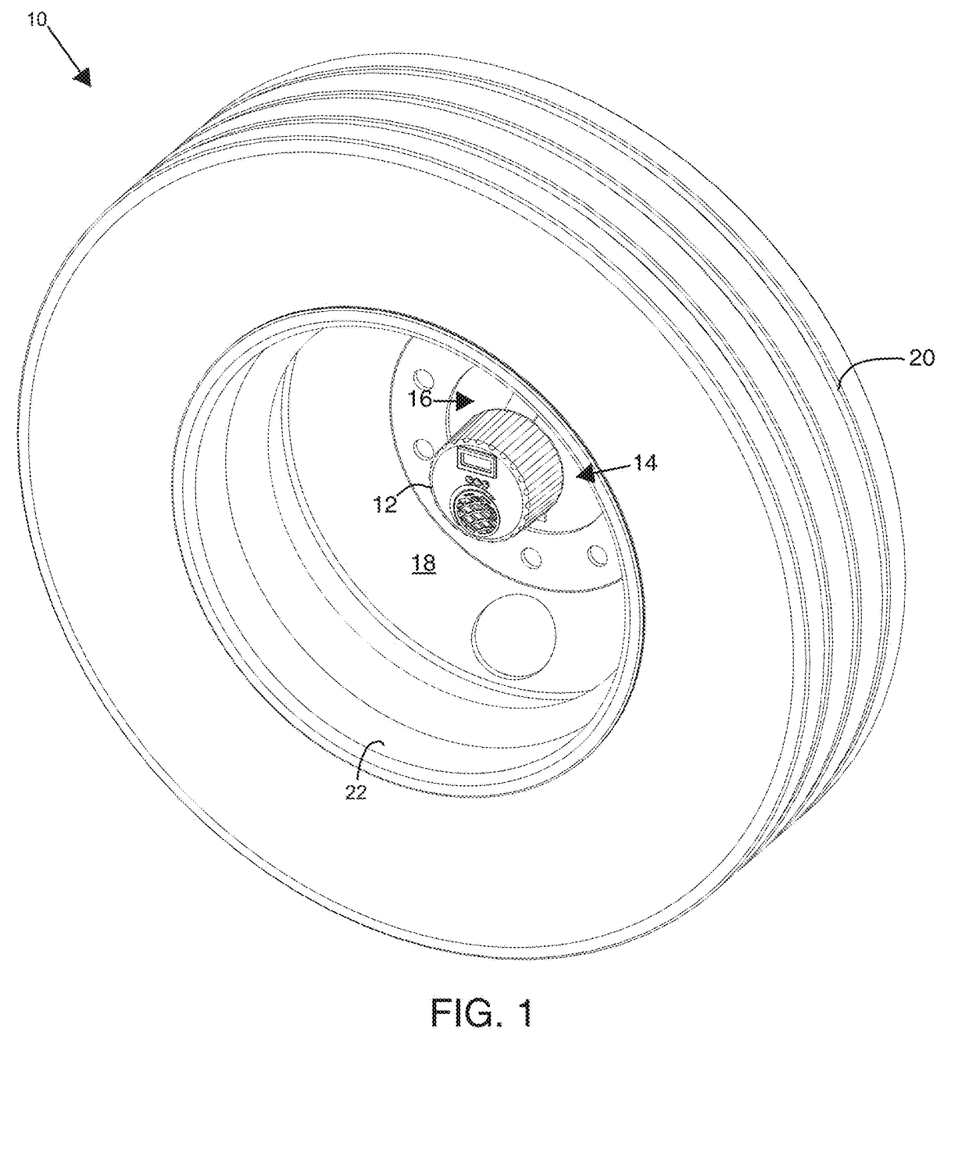
FIGS. 1 and 2 are, respectively, front and back isometric views of a hub-mountable wheel-rotation detector at its mounting location for installation on a hub of a rear trailer wheel, according to one embodiment.
Figure 2:
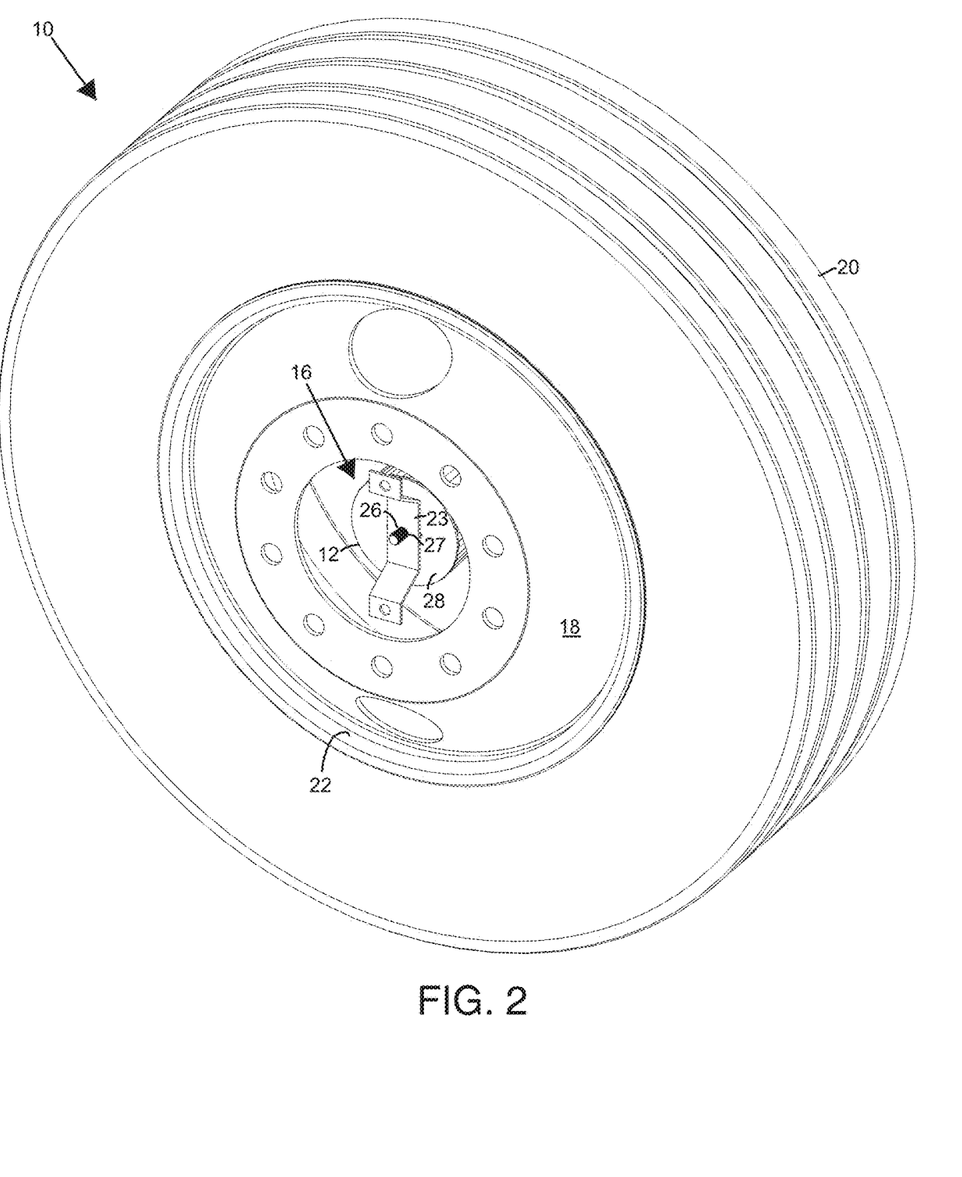

FIGS. 1 and 2 show a semi-truck trailer wheel 10 and a hub-mounted vehicle motion detector 12 positioned at its mounting location 14. Detector 12 engages a distal end of a hub 15 (FIGS. 3 and 4) that extends through a center bore 16 of a wheel disc 18 supporting a truck tire 20 on a rim 22 of wheel 10. As hub 15 turns wheel 10, detector 12 recognizes the rotational direction (i.e., clockwise or counter-clockwise rotation) and determines from it whether the vehicle is moving forward or in reverse.

Detector 12 may be mounted on a driver or passenger side of a vehicle. Once the side is selected, that selection is entered into a configuration menu (described later) of detector 12 so that detector 12 may use the configured information for determining whether clockwise or counterclockwise rotation of wheel 10 corresponds to reversing.

In response to determining that the vehicle is moving in reverse, detector 12 emits from its internal speaker an audible alarm. In some embodiments, detector 12 may provide a visual alarm. Accordingly, location 14 is typically toward the rear of the semi-truck so that people nearby can hear or see the alarm that serves to warn passersby, workers, or the like that the vehicle is reversing.

When forward motion is detected, detector 12 increments distance traveled and charges an internal battery. The battery recharging system is typically activated as a vehicle reaches speeds exceeding about 25 to 30 MPH, and will charge the internal battery to maintain a power source available for electrical components of detector 12.

Figure 3:
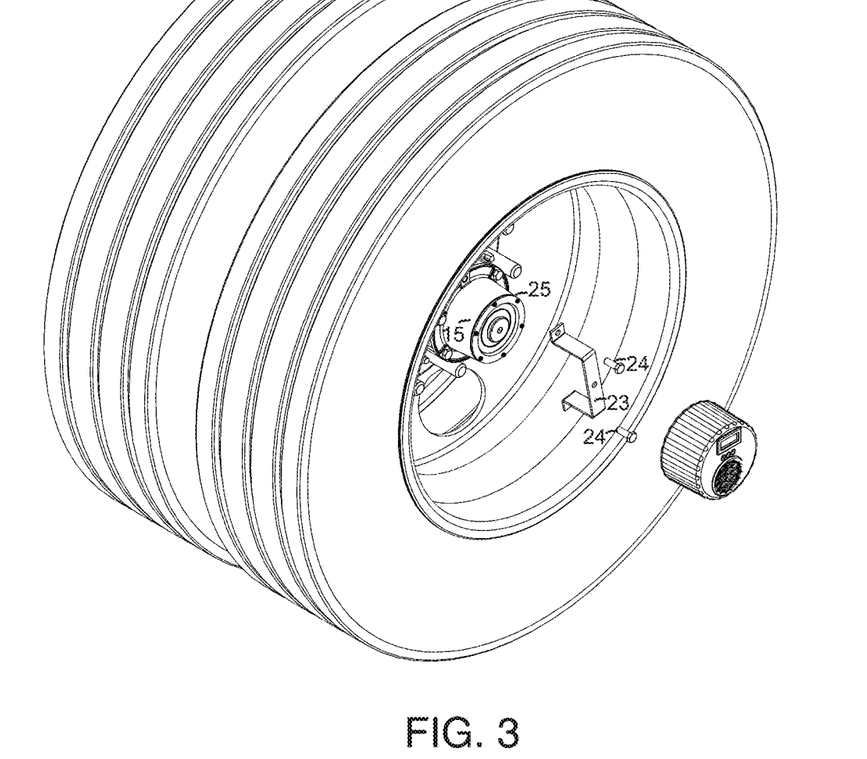
FIGS. 3 and 4 are, respectively, partly exploded and front isometric views showing the hub-mountable wheel-rotation detector being installed on the hub.
Figure 4:
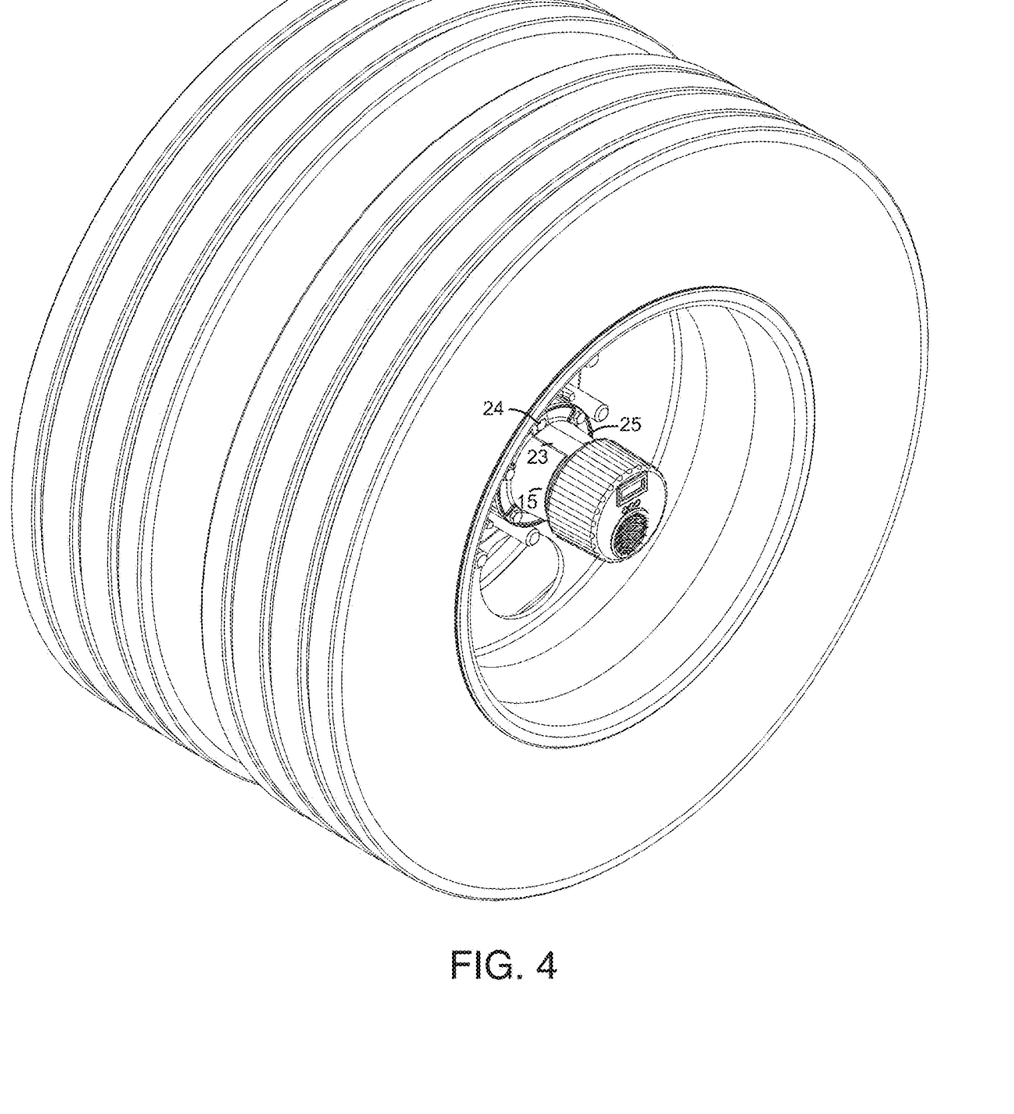

FIGS. 3 and 4 show a mounting bracket 23 for securing detector 12 to hub 15 with a pair of axle shaft bolts 24 that also retain an axle-shaft cover 25. Accordingly, mounting bracket 23 is compatible with an industry standard five- or eight-bolt pattern of axle shaft bolts, but a central bolt hole 26 shown in FIG. 2 may be used for mounting detector 12 with a single center bolt 27 that secures a back plate 28 of detector 12 to hub 15. Once mounting bracket 23 is installed, full installation of detector 12 is achieved with center bolt 27 and a nut.

Figures 5, 6:
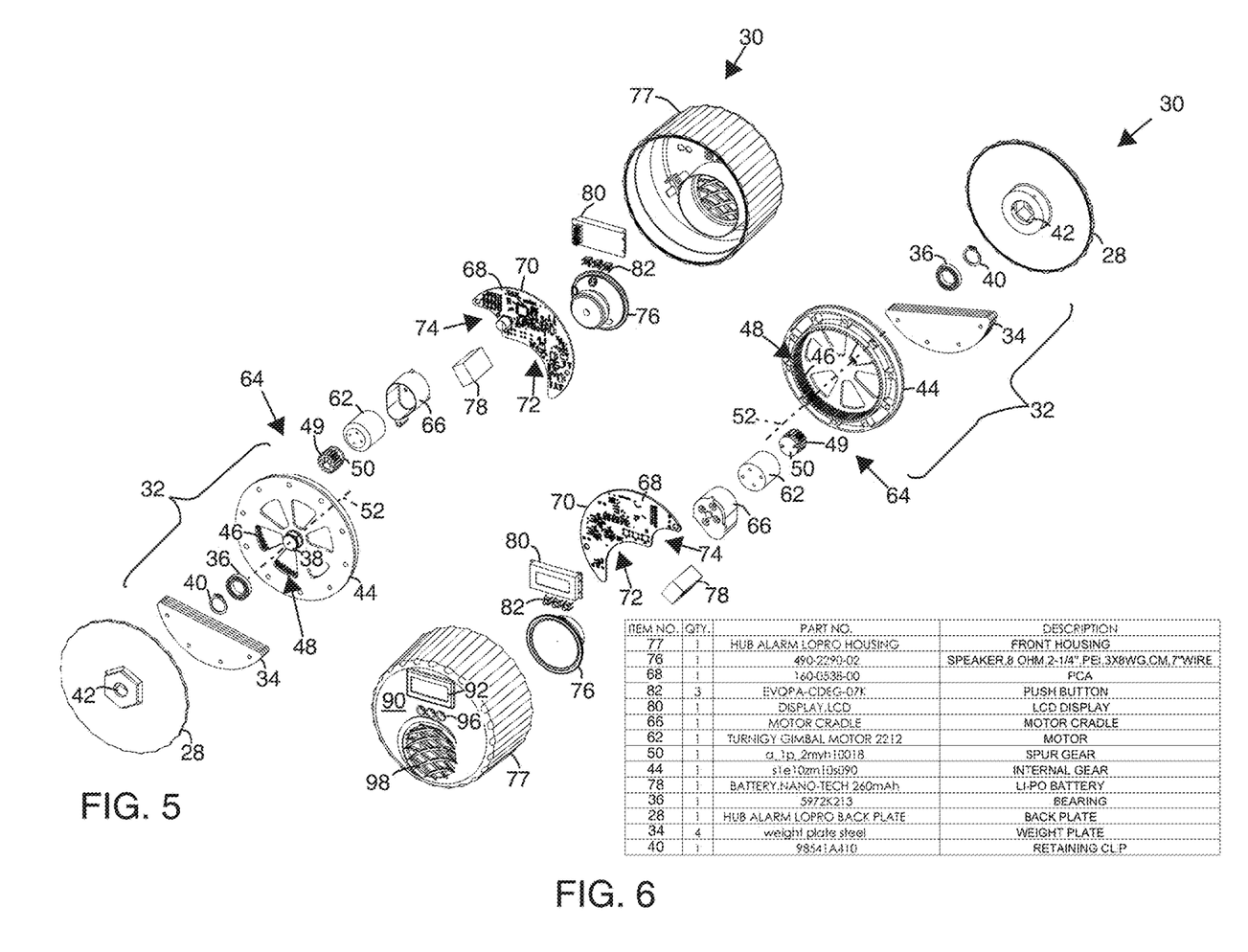
Figure 7:
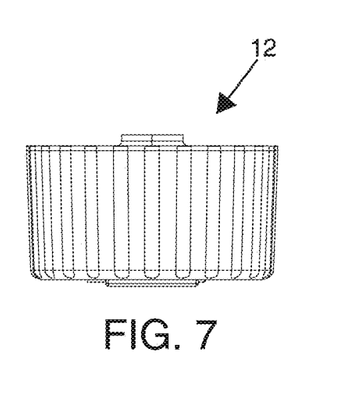
FIGS. 7, 8, 9, and 10 are, respectively, top plan, right-side elevation, isometric, and frontal views of the hub-mountable wheel-rotation detector.
Figure 8:
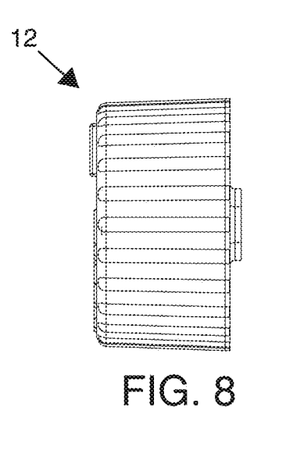
Figure 9:
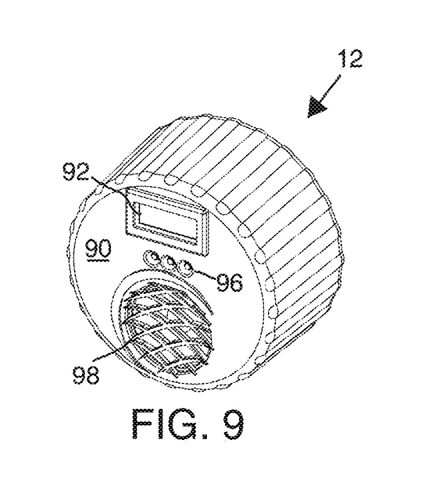

FIGS. 5 and 6 show hardware components 30 of detector 12. Each of hardware components 30, with the exception of a weighted gear assembly 32, rotates with hub 15 as the vehicle moves. Weighted gear assembly 32, however, remains substantially stationary with respect to the direction of gravitational force because assembly 32 includes a counterweight 34 and a ring-shaped rolling bearing 36 that allow assembly 32 to hang freely as hub 15 spins. Specifically, rolling bearing 36 is held onto a stub shaft 38 (FIG. 5) by a retaining clip 40. Stub shaft 38 and rolling bearing 36 are inserted into a mounting aperture 42 of back plate 28 so that rolling bearing 36 allows relative movement (rotation) between back plate 28 and stub shaft 38.

Stub shaft 38 extends from an annular internal ring gear 44 of assembly 32. Due to the weight of counterweight 34 and motion of rolling elements (such as balls or rollers) of rolling bearing 36, internal ring gear 44 also remains substantially stationary as hub 15 spins. Teeth 46, formed on an inner cylinder 48 of internal ring gear 44, mesh with teeth 49 of a planetary spur gear 50. As planetary spur gear 50 orbits about a longitudinal axis 52 of stub shaft 38, and teeth 49 roll about an inside of a pitch circle corresponding to inner cylinder 48, torque is transferred from hub 15 to a brushless DC electric motor 62 (referred to as generator 62) acting as a polyphase electromagnetic generator producing multiple phase-displaced electrical output signals in the form of a three-phase AC signal. Thus, the polyphase electromagnetic generator is a three-phase electromagnetic generator, but the term also encompasses any multi-phase device that converts motive power into electrical power for use in an electrical circuit.

A longitudinal axis defined by a rotor (not shown) of generator 62 is radially spaced apart from that of hub 15 and stub shaft 36. And the aforementioned pair of gears between hub 15 and generator 62 are mounted such that the center of one gear revolves around the center of the other gear. Thus, internal ring gear 44 and planetary spur gear 50 form an epicyclic gear train 64 to spin the rotor and generate electricity.

Epicyclic gear train 64 has a 5:1 gear ratio in which generator 62 spins at a rate of five times the revolutions per minute (RPM) of hub 15. The five-fold increase in RPM improves an amount of energy generated by generator 62. For example, a typical tire is about 41 inches (104.14 cm) in diameter, yielding about 492 revolutions per mile. At 30 MPH, the tire rotates at about 246 RPM, and at 60 MPH the tire rotates at about 492 RPM. Generating power at these relatively low RPMs is made possible by increasing the generator speed to approximately 1,230 RPM at 30 MPH by the mechanical advantage of the 5:1 gear ratio provided by epicyclic gear train 64. In other embodiments, various other types of gear trains (i.e., gear sets) or gear configurations may be employed.

Generator 62 fits within a motor cradle 66 and is electrically connected to circuitry soldered on a printed circuit board assembly (PCA) 68. PCA 68 is a semicircular-shaped board including an arcuate perimeter 70 opposite a first arcuate void 72 and a second arcuate void 74. Void 72 is sized to accommodate an internal alarm component, such as a speaker 76, whereas void 74 is sized to accommodate motor cradle 66. This compact arrangement reduces the overall size of detector 12. According to one embodiment, an outside diameter of an outer housing 77 is less than seven inches (17.8 cm), and a depth of detector 12 is less than 3.5 inches (8.9 cm).

The electrical circuitry (shown in FIG. 12) of PCA 68 is also coupled to a lithium-polymer battery 78, liquid crystal display (LCD) module 80, and user-interface controls, such as push buttons 82.

LCD module 80 and push buttons 82 provide an externally accessible user interface for detector 12. For example, a front face 90 (FIG. 6) of housing 77 includes a sealed window 92 for viewing LCD module 80. And below window 92 are three membranes 96 that allow a user to control menus presented on LCD module 80 by pressing buttons 82 through corresponding membranes 96. Window 92 and membranes 96 inhibit water intrusion. Likewise, a speaker grill 98 provided on front face 90 is water resistant. Thus, when housing 77 is mated with and sealed to back plate 28, detector 12 prevents water from reaching hardware components 30 sealed inside.

Figure 10:
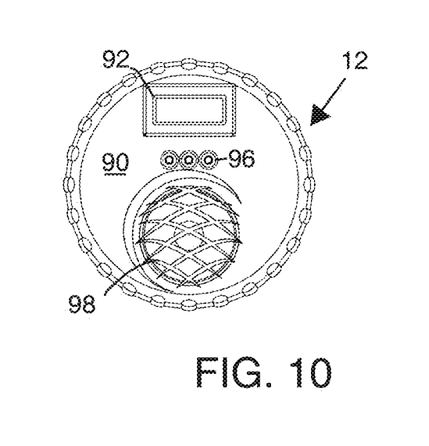

FIGS. 7-10 show detector 12 in greater detail. In particular, FIG. 10 shows the user interface (window 92 for LCD module 80 and membranes 96 for buttons 82) for manipulating configuration menus that configure software settings of detector 12. Any button press will cause detector 12 to wake up and present on LCD module 80 a configuration menu. Configuration menus are provided to, among other things, indicate which side of a vehicle detector 12 is mounted on. For example, one configuration menu is used to select whether detector 12 is mounted on a right side of the vehicle or a left side of the vehicle, and that information is accessed when detector 12 determines whether the vehicle is moving forward or backward. Another configuration option allows selection of distance units (e.g., miles or kilometers). The menus are also used for selecting tire sizes that factor into distance and speed calculations. And if tire sizes are not known, a user may place detector 12 into a learning mode. Finally, LCD module 80 also shows an odometer reading or other information when not being used for configuration. In other embodiments, a configuration setting is established through switch positions. For example, a switch (not shown) may be slid into a switch position indicating the mounting side or otherwise indicating how the wheel rotation relates to a direction of travel for the vehicle.

A tire circumference may be preconfigured by a user using the user interface to enter in a tire size measurement (e.g., diameter). In another embodiment, the circumference may be derived during the so-called learning mode in which the user interface is used to select an option for driving the vehicle a predetermined distance. Because the distance driven is known, the number of rotations observed upon driving that distance may be used to calculate the tire circumference. For example, if a user did not know the tire size or how many revolutions it takes for the tire size to equal one mile or kilometer, then the user could activate the learning mode. To enter learning mode, the user presses some of buttons 82 for approximately six seconds. In the learning mode, the user drives a determined amount (e.g., one-half mile, as measured by an in-cab odometer of the vehicle itself) and then stops. Once stopped, the user can exit the learning mode by pressing a button on the user interface. Based on how many rotations are measured for that determined distance, detector 12 automatically calculates the rotations per mile (or kilometer) for the learned tire size. In other words, detector 12 derives tire size or similar information that may then be used for distance or speed tracking.

Figure 11:
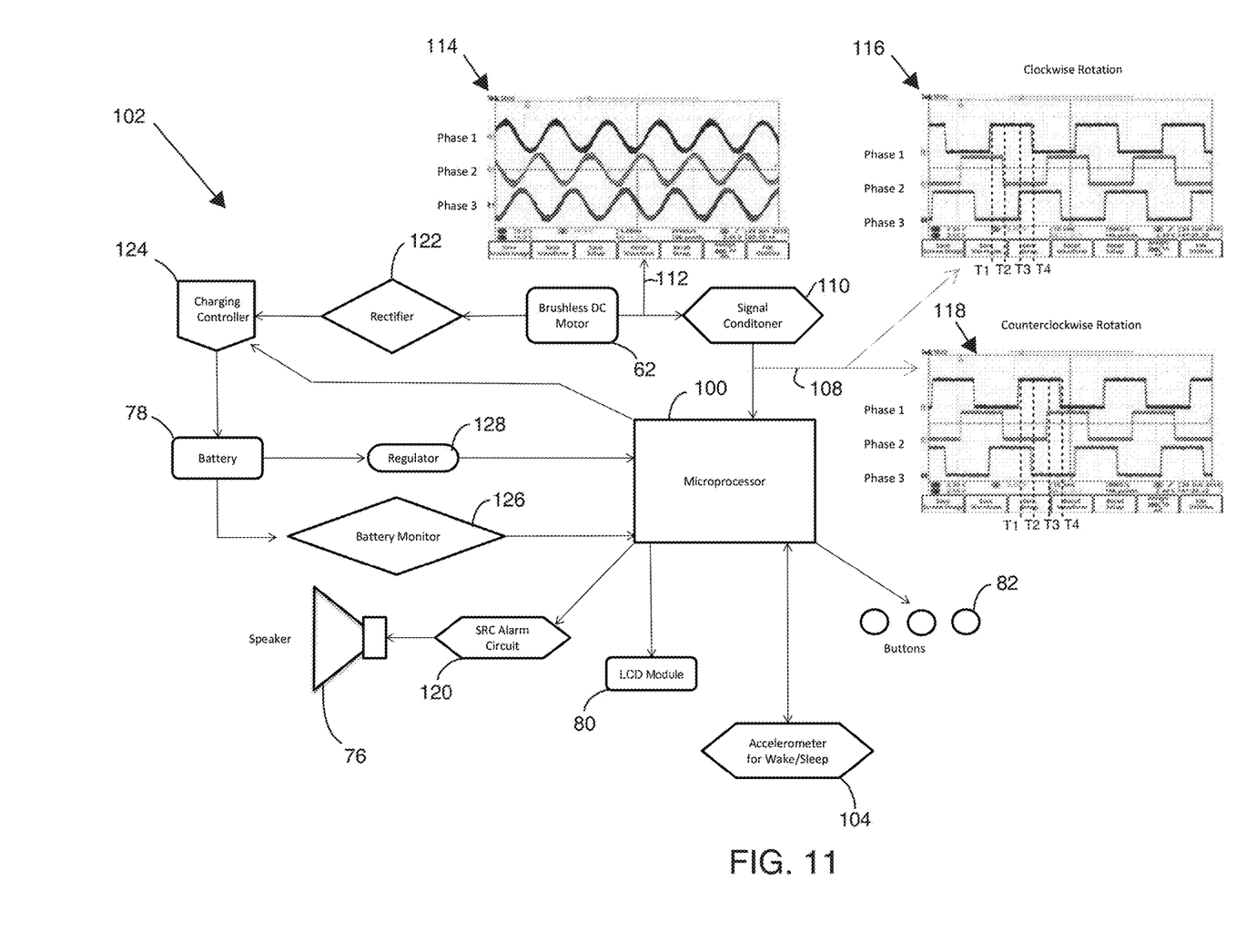
FIG. 11 is a block diagram of electrical devices and associated circuitry modules of the hub-mountable wheel-rotation detector, showing waveform diagrams of three-phase alternating current (AC) signals and conditioned rotation-detection signals used for differentiating between clockwise and counterclockwise rotation and determining distance traveled or other vehicle-travel information.

FIG. 11 illustrates how a microcontroller 100 of detector 12 cooperates with other wheel-rotation detector circuitry 102 to detect motion and provide alarms. Initially, when an accelerometer 104 detects any movement, it provides a wakeup signal to microcontroller 100 that transitions microcontroller 100 from its low-power, power saving mode to its processing mode. In other words, accelerometer 104 is used to put detector 12 to sleep and to wake it up in response to any motion. Once awoken, microcontroller 100 immediately looks for three-phase digitized rotation-detection signals 108 provided by signal conditioner circuitry 110 operatively coupled to generator 62. If no motion is detected after 30 seconds, detector 12 automatically goes back to sleep to preserve battery power until motion is detected again.

The brushless DC motor, operating as generator 62 when spun relative to weighted gear assembly 32, provides three-phase AC output signals 112 shown in a waveform diagram 114. In the example shown by waveform diagram 114, phase 3 leads phase 1, which occurs during clockwise rotation. During counterclockwise rotation, phase 3 lags phase 1.

Output signals 112 are digitized by signal conditioner circuitry 110 to produce three-phase digitized rotation-detection signals 108. A first set of phase-displaced waveforms generated in response to clockwise rotation are shown in a waveform diagram 116. A second set of phase-displaced waveforms generated in response to counterclockwise rotation are shown in a waveform diagram 118. As explained in the following paragraph, the first and second sets have different phase displacements, and this difference is detectable by microcontroller 100 to determine the direction of rotation and travel.

Based on digitized signals 108, microcontroller 100 detects the direction of rotation by tracking whether phase 1 leads or lags phase 3 (or based on another difference in the relative timing or sequence of pulses) because the sequence of the phases corresponds to which direction that generator 62 is spun. For example, the following table shows logic-level states of digitized signals 108 at four sample times indicated by dashed lines in waveform diagrams 116 and 118.

TABLE 1

| | Clockwise | | | Counterclockwise | | |
|---|---|---|---|---|---|---|
| Time | Phase 1 | Phase 2 | Phase 3 | Phase 1 | Phase 2 | Phase 3 |
| T1 | High | High | Low | High | Low | High |
| T2 | High | Low | Low | High | Low | Low |
| T3 | High | Low | High | High | High | Low |
| T4 | Low | Low | High | Low | High | Low |

As indicated in Table 1, microcontroller 100 tracks the states and determines whether they follow the expected sequence for clockwise or counterclockwise rotation. According to some embodiments, microcontroller 100 determines the states of digitized signals 108 by continuously sampling each phase using three external input pins (labeled RD4-RD6, FIG. 12). In other embodiments, three external input pins are configured to trigger external interrupts in response to changes of logic levels of each phase. The external interrupts are then handled by microcontroller 100 in an interrupt service routine that updates the states of the phases. A main routine may then check the states for determining the direction of rotation.

Once it has determined the direction of rotation, microcontroller 100 then determines whether the rotation is moving the vehicle forward or backward. For example, microcontroller 100 reads from an associated machine-readable storage device the preconfigured configuration setting information indicating whether detector 12 is installed on the right or left side (i.e., curb side or opposite curb side). If detector 12 is on the curb side, then clockwise rotation corresponds to forward movement and counterclockwise rotation corresponds to reverse movement. If detector 12 is installed opposite to the curb side, then counterclockwise rotation corresponds to forward movement and clockwise rotation corresponds to reverse movement. As noted previously, the mounting location information is configured using buttons 82 to enter a desired configuration. In other embodiments, a configuration settings is established using switches.

Once the direction of travel is determined, microcontroller 100 determines whether to activate an alarm; derive speed, mileage, or other types of vehicle-travel information; or charge battery 78.

When microcontroller 100 detects the vehicle is moving in reverse, it signals alarm circuitry 120 to produce a backup alarm. Speaker 76, coupled to alarm circuitry 120, then emits a 97 decibel (dB) alarm. In some embodiments, a lamp or other type of alarm may be activated.

For determining vehicle-travel information to present on LCD module 80, microcontroller 100 uses one or more phases of digitized signals 108 to determine a number of rotations of generator 62. The number of rotations is determined by counting pulses of a given phase of digitized signals 108. For example, in some embodiments, seven pulses correspond to one 360 degree rotation of generator 62. The number of rotations of generator 62 is then scaled (multiplied or divided) by a scaling factor based on the gear ratio to obtain a total number of pulses per each 360 rotation of hub 15. The number of rotations of hub 15 (or another number representing hub rotations, e.g., total pulses per hub rotation) is then multiplied by a preconfigured tire circumference to obtain a measure of distance traveled (e.g., mileage) that is used to increment the odometer, determine fuel efficiency, or derive other measurements. For example, microcontroller 100 may also determine speed based on frequency of pulses or elapsed time per hub rotation.

FIG. 11 also shows circuitry to monitor and recharge battery 78. One or more output signals 112 are provided to a rectifier 122 that converts them into a rectified DC voltage provided to charging controller circuitry 124. Microcontroller 100 determines whether the speed (or pulse frequency) is sufficient for charging battery 78. According to some embodiments, at speeds of approximately 25 to 30 MPH in the forward direction, microcontroller 100 detects that generator 62 is producing sufficient energy and enables charging controller circuitry 124 to charge battery 78. In some embodiments, charging occurs after battery monitor circuitry 126 also indicates to microcontroller 100 that battery voltage is below a desired threshold. Battery voltage is regulated by a DC regulator 128.

Figure 12:
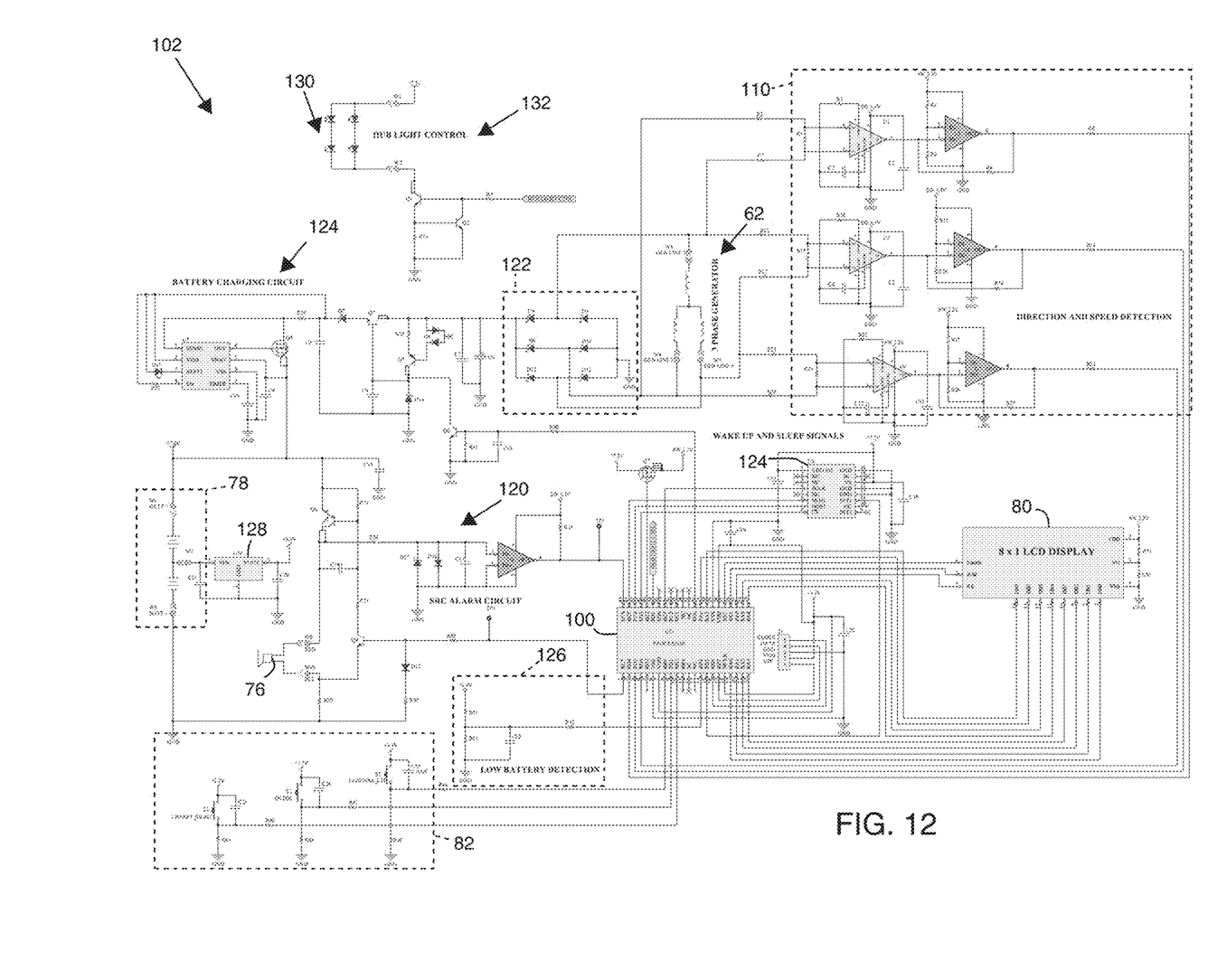
FIG. 12 is an electrical schematic diagram of components comprising electrical devices and associated circuitry modules shown in FIG. 11, according to one embodiment.

FIG. 12 shows, in electrical schematic form, microcontroller 100 and other wheel-rotation detector circuitry 102 of FIG. 11. With the exception of generator 62, speaker 76, and battery 78, the components shown in FIG. 12 are soldered to a surface of PCA 68 (FIGS. 5 and 6).

Microcontroller 100 is a CMOS FLASH-based 8-bit microcontroller based on a PIC® architecture and packaged as a 44-pin integrated circuit (U11) available from Microchip Technology Inc. of Chandler, Ariz. Microcontroller 100 features, among other things, 256 bytes of EEPROM data memory, two comparators, and 14 channels of 10-bit analog-to-digital converter (ADC).

Accelerometer 104 is an ultralow power, three-axis digital output microelectromechanical systems (MEMS) accelerometer in the form of an integrated circuit (U8) available from Analog Devices, Inc. of Norwood, Mass. In other embodiments, an accelerometer may be integrated in microcontroller 100.

Generator 62 is a brushless gimbal motor available from HexTronik Limited of Hong Kong. Each of its three phases is carried by a separate conductor line (W3, W4, and W5) to be conditioned by signal conditioner circuitry 110. Specifically, an AC phase signal is conditioned by a pair of opamps (e.g., U1 and U2) that filter and level shift the phase signal and thereby convert it to a digital signal that rapidly switches between zero and 3.3 volt logic levels. Other embodiments for digitizing an AC phase signal may include a comparator or other digitizing circuitry techniques. The digitized signal is then applied to a corresponding input pin of microcontroller 100. In other embodiments, the AC phase signal may be converted to a digital value by an ADC integrated in or external to microcontroller 100.

Rectifier 122 is a three-phase bridge rectifier formed from multiple, rapid-switching Schottky diodes (D5, D6, D9, D10, D12, and D13).

Battery charging controller 124 is a single or dual cell lithium-ion or lithium-polymer charge management controller integrated circuit (U5) available from Microchip Technology Inc. Controller 124 may be enabled or disabled in response to microcontroller 100 applying a voltage to a pin (RC0) that switches a bi-polar junction transistor (BJT) (Q6). For example, battery monitor circuitry 126, which provides a voltage to a pin (RB4) of microcontroller 100, may indicate that no charging is desired, in which case microcontroller 100 disables battery charging controller 124 by controlling the Q6 BJT. Similarly, speaker 76 is controlled by microcontroller 100 applying a voltage to a pin (RC7) that controls a BJT (Q9). Feedback on the state of speaker 76 is sensed through alarm circuitry 120 including an opamp (U9) that outputs a signal to a pin (RC6) of microcontroller 100. In other words, the voltage on the speaker is monitored by the alarm circuitry including an opamp (U9) that outputs a signal to an input (RC6) of microcontroller 100 which initiates another audio cycle. This process is continued for as long as an audible sound is desired.

Voltage regulator 128 is a DC-to-DC regulator integrated circuit (U10) also available from Microchip Technology Inc.

LCD module 80 is an 8 character×1 line module available from Newhaven Display International Inc. of Elgin, Ill. This module is not backlit, so a separate hub light 130 and hub light control device 132 are included. When a user presses any one of three buttons 82, microcontroller 100 activates a BJT (Q1) that switches on multiple light emitting diodes (LEDs) to illuminate LCD module 80 and emit light from grill 98 (FIG. 10).

In other embodiments, grill 98 is removable so that other modules, in addition to or in lieu of speaker 76, may be swapped into housing 77 of detector 12. For example, some users may swap out a speaker for a light alarm device. Other uses may install a radio frequency (RF) transceiver module, such as a Bluetooth radio or similar components for a personal area network (PAN) or a wireless local area network (WLAN). Using a wireless transmitter, detector 12 can transmit alerts concerning maintenance or fuel efficiency. For example, after a predetermined number of miles, detector 12 could transmit a request for axle oil or other maintenance requests. Detector 12 may also use a wireless receiver for wirelessly receiving configuration settings.

Skilled persons will understand that many changes may be made to the details of the above-described embodiments without departing from the underlying principles of the invention. The scope of the present invention should, therefore, be determined only by the following claims.

The invention claimed is:

1. A method, performed by a hub-mountable wheel-rotation detector, for determining a direction of travel of a vehicle based on its wheel rotation, the method comprising:
   in response to the wheel rotation, producing multiple phase-displaced electrical output signals from a polyphase electromagnetic generator, the multiple phase-displaced electrical output signals providing a first set of phase-displaced waveforms in response to clockwise rotation and a second set of phase-displaced waveforms in response to counterclockwise rotation, the second set of phase-displaced waveforms having a phase displacement that is different from that of the first set of phase-displaced waveforms;
   determining a rotational direction based on different phase displacements between the first and second sets of phase-displaced waveforms; and
   determining the direction of travel of the vehicle by accessing a configuration setting indicating whether the rotational direction corresponds to one of a forward or backward direction of travel.

2. The method of claim 1, further comprising emitting a perceptible alarm in response to determining the direction of travel is in the backward direction.

3. The method of claim 2, in which the perceptible alarm is light emission.

4. The method of claim 2, in which the perceptible alarm is an audible sound.

5. The method of claim 1, further comprising calculating distance traveled in response to determining that the direction of travel is in the forward direction.

6. The method of claim 5, further comprising:
counting a number of rotations in the forward direction;
receiving information indicating a circumference of a wheel on which the hub-mountable wheel-rotation detector is mounted; and
calculating the distance traveled by multiplying the circumference times a number of rotations.

7. The method of claim 5, further comprising generating an alert in response to the distance traveled indicating that the vehicle is in need of maintenance due to an amount of the distance traveled.

8. The method of claim 7, further comprising wirelessly transmitting the alert.

9. The method of claim 1, further comprising receiving the configuration setting through a user interface, the configuration setting indicating a side of the vehicle on which the hub-mountable wheel-rotation detector is mounted.

10. The method of claim 1, further comprising charging an internal battery in response to the wheel rotation.

* * * * *